United States Patent
Siegel

[15] 3,674,771
[45] July 4, 1972

[54] PHENYL-AZO-PHENOL DYESTUFFS

[72] Inventor: Edgar Siegel, Leverkusen, Germany

[73] Assignee: Farbenfabriken Bayer Aktiengesellschaft, Leverkusen, Germany

[22] Filed: March 13, 1970

[21] Appl. No.: 19,460

[30] Foreign Application Priority Data

March 20, 1969 Germany .................P 19 14 060.4

[52] U.S. Cl. ..............................260/206, 8/41 B
[51] Int. Cl. ....................C07c 107/06, C09b 29/12
[58] Field of Search ...................................260/206

[56] References Cited

UNITED STATES PATENTS 3,208,813  9/1965  Tanaka et al. .....................260/206 X

FOREIGN PATENTS OR APPLICATIONS

| 196,651 | 6/1938 | Switzerland | 260/206 |
| 198,330 | 9/1938 | Switzerland | 260/206 |
| 198,331 | 9/1938 | Switzerland | 260/206 |
| 198,332 | 9/1938 | Switzerland | 260/206 |
| 198,334 | 9/1938 | Switzerland | 260/206 |

*Primary Examiner*—Henry R. Jiles
*Assistant Examiner*—C. F. Warren
*Attorney*—Plumley & Tyner

[57] ABSTRACT

Water-soluble monoazo dyestuffs of general formula

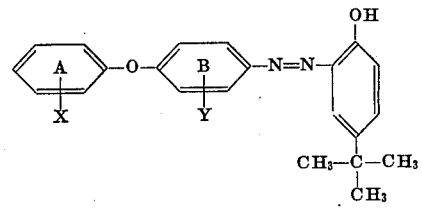

wherein one of the residues X or Y in each case denotes a sulpho group and the other denotes hydrogen, and wherein the benzene nuclei A and B can be substituted by chlorine or alkyl groups with one to four C atoms as well as their preparation and their use for dyeing polyamide fibers in a neutral to weakly acid medium.

1 Claim, No Drawings

PHENYL-AZO-PHENOL DYESTUFFS

The subject of the present invention is new, valuable, water-soluble monoazo dyestuffs of general formula

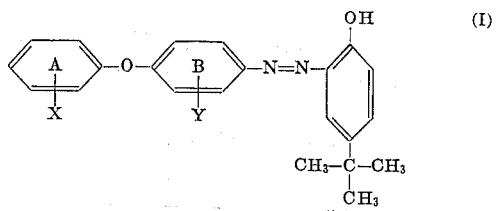 (I)

wherein
one of the residues X or Y in each case denotes a sulpho group and the other denotes hydrogen, and wherein the benzene nuclei A and B can be further substituted by chlorine or alkyl groups with one–four C atoms.

The new dyestuffs are obtained in a manner which is in itself known by coupling diazotized 4-amino-diphenyl-ether-monosulphonic acids of general formula

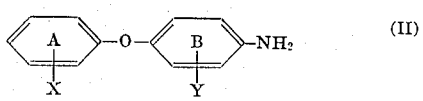 (II)

wherein
X and Y have the abovementioned significance, and
A and B can be substituted in the indicated manner, with 4-tert.-butyphenol

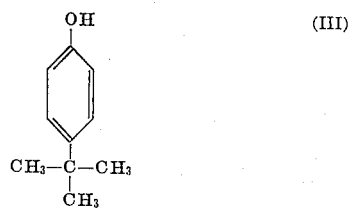 (III)

in alkaline medium.

Suitable 4-aminodiphenyl-ether-monosulphonic acids are for example 4-amino-diphenyl-ether-(2)-sulphonic acid, 4-amino-diphenyl-ether-(4')-sulphonic acid, 4-amino-diphenyl-ether-3'-methyl-(4')-sulphonic acid, 4-amino-diphenyl-ether-4'-methyl-(2')-sulphonic acid, 4-amino-diphenyl-ether-4'-chloro-(2)-sulphonic acid and 4-amino-diphenyl-ether-2',4'-dichloro-(2)-sulphonic acid.

The dyestuffs according to the invention are particularly suitable for dyeing polyamide fibers in level, strong, clear yellow shades of very good light fastness. They are well absorbed onto polyamide fibers in a neutral to weakly acid dyebath.

EXAMPLE 1

26.5 g (=0.1 mol) of 4-aminodiphenyl-ether-(2)-sulphonic acid are dissolved in 200 ml of water, together with sodium hydroxide solution, at pH 7, 6.9 g of sodium nitrite are then added and after cooling to 0°–5° 28 ml of concentrated hydrochloric acid are added. The diazotization is finished after 30 minutes. The diazo suspension is introduced into a solution of 15 g (=0.1 mol) of 4-tert.-butylphenol in 200 ml of water + 6 of 40 percent strength sodium hydroxide solution + 28 g of sodium carbonate. The yellow dyestuff which immediately forms is precipitated and is filtered off and dried at 50° Yield 41 g.

If the procedure of example 1 is followed but equivalent amounts of the diazo components mentioned on above are employed, valuable water-soluble monoazo dyestuffs are again obtained which dye polyamide in clear, yellow shades of excellent light fastness.

EXAMPLE 2

A dyebath consisting of 100 parts by weight of polyamide carpet material and 4,000 parts or water is adjusted to pH 6 by adding 2 parts of acetic acid.

1 part of the dyestuff obtained according to example 1, dissolved in a little hot water, is added thereto at 40° C., the whole is heated to the boil over the course of 30 minutes, and dyeing is carried out at the boil for one hour at pH 6–7, in the course of which the bath is largely exhausted. After rinsing and drying, the polyamide carpet is found to be dyed in a clear greenish-tinged yellow shade of excellent light fastness.

We claim:
1. Water-soluble monoazo dyestuffs of general formula

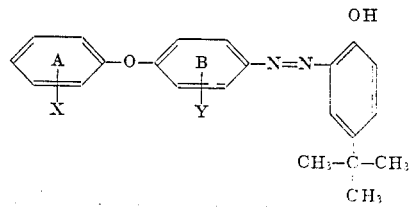

wherein
one of X or Y in each case denotes a sulfonic acid group and the other denotes hydrogen, and wherein the benzene nuclei A and B can be substituted by chlorine or alkyl groups with one–four C atoms.

* * * * *